March 7, 1967 M. W. SULLIVAN 3,308,045
PROCESS AND APPARATUS FOR TREATING PLASTICS
Filed Oct. 16, 1962 2 Sheets-Sheet 1
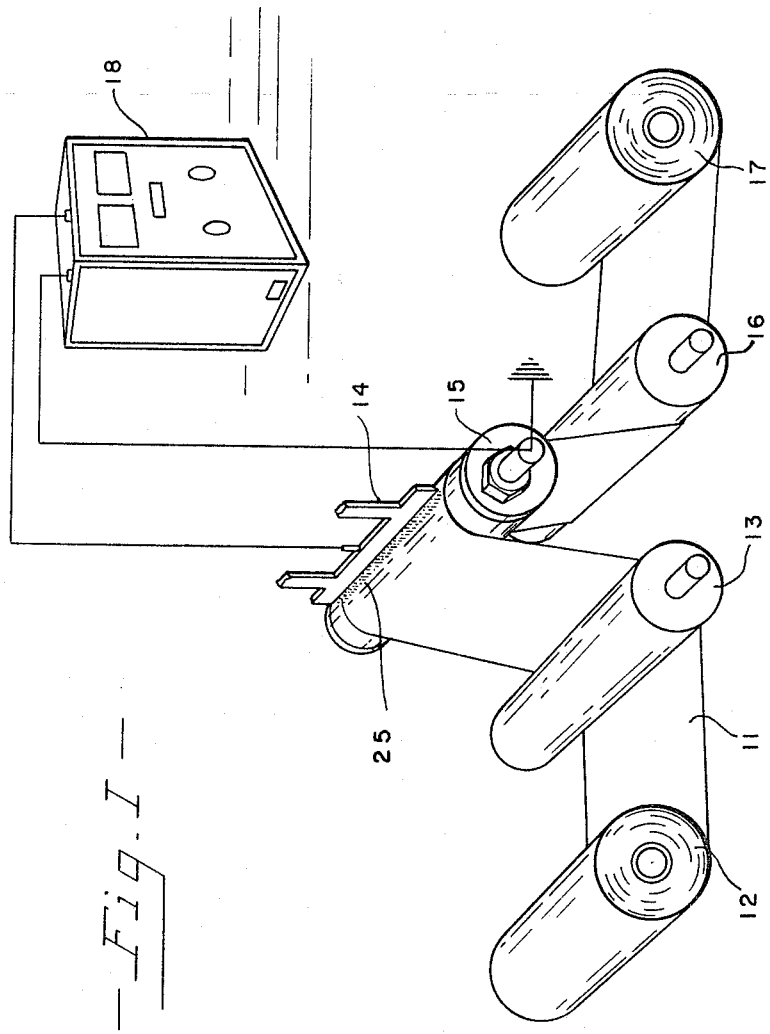
Fig. I
MICHAEL W. SULLIVAN INVENTOR.
BY H B Roberts
ATTORNEY.

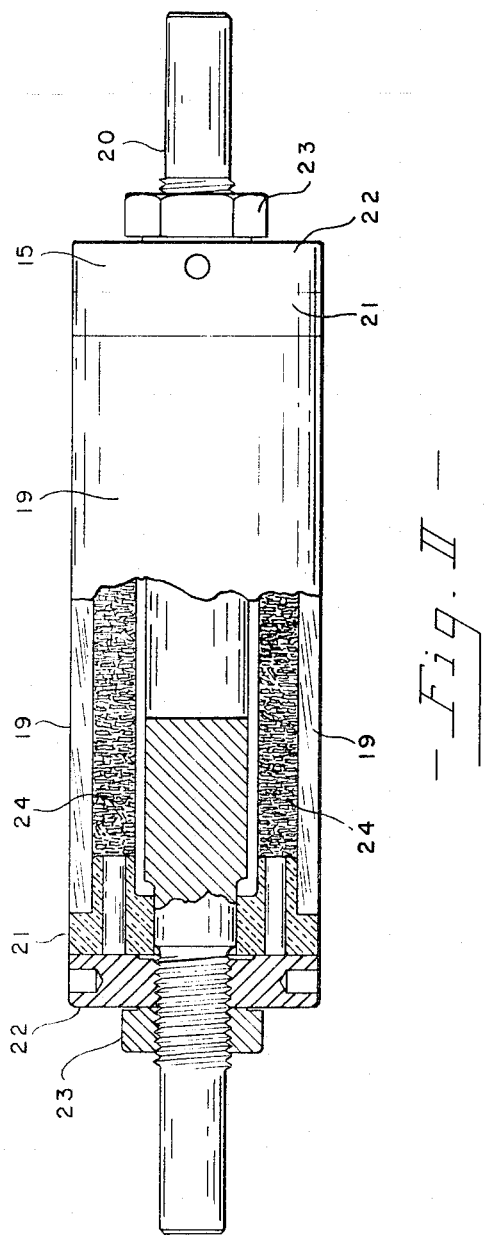

United States Patent Office 3,308,045
Patented Mar. 7, 1967

3,308,045
PROCESS AND APPARATUS FOR TREATING PLASTICS
Michael W. Sullivan, Morristown, N.J., assignor to Monsanto Company, a corporation of Delaware
Filed Oct. 16, 1962, Ser. No. 230,911
16 Claims. (Cl. 204—165)

This invention relates to an improved method for treating the surface of plastic materials to render them capable of adhering to subsequently applied coatings such as printing inks, paints, pigments, adhesives, and various other materials which it may be desired to coat, print or otherwise attach to the treated surfaces.

Various devices and methods have been used to improve the adhesive properties of plastic materials, particularly polyolefins such as polyethylene and polypropylene. For example, U.S. Patents 2,632,921, 2,648,097, 2,683,894, 2,704,382 and 2,746,084 disclose various flame treating methods. These methods of treating plastic surfaces are somewhat objectionable because of the problems associated with the use of open flames, obtaining a uniform treatment, etc. Another method for treating the surfaces of plastic materials is subjecting such plastic surfaces to an electrostatic discharge, as described in U.S. Patent 3,018,189. Although this treatment is an improvement over the flame treatment, it is not completely satisfactory in that the electrical discharge device tends to spark and rupture thin gauge films and requires close regulation coupled with relatively low speed passage of the film through the treating zone. The present invention is concerned with improvements in the method and apparatus disclosed in U.S. Patent 3,018,189.

Thus, it is an object of this invention to provide an improved, inexpensive, rapid, electrostatic treatment of plastic materials. It is another object to provide an improved apparatus for an inexpensive, rapid, electrostatic treatment of plastic materials.

In particular, this invention is concerned with the use of a grounding electrode having a non-conductive surface across which the plastic composition to be treated is passed.

This invention relates to an apparatus and method whereby a plastic material, such as a flexible plastic film, is treated with an electrostatic discharge by passing the plastic material between a discharge electrode and a support which also functions as a collector electrode of the electrostatic discharge device, the support being comprised of a substantially non-conductive, non-metallic outer surface having attached thereto on the under side away from the plastic material to be treated a conductor which acts as a ground for the electrostatic treating device.

The invention is illustrated by the drawings wherein FIGURE I is a perspective view of the treating device and generator; and, FIGURE II is an enlarged cross-section showing one embodiment of the invention.

The invention is best illustrated by referring to the drawings but the invention is not limited to the embodiments shown therein. In FIGURE I, a sheet of plastic film 11 is unwound from a roll 12 passed under an idler roll 13 between the discharge device 14 and the grounding electrode 15 under an idler roller 16 and onto a take-up roll 17. In the practice of the invention, a standard high frequency spark generator 18 may be used to apply a potential to the discharge bar 14. The discharge bar 14 is placed in spaced-apart relationship with the grounding electrode 15 but close enough to complete a circuit through the non-conductive outer surface of the roller 15 and with sufficient potential to provide a uniform pattern of discharge along the bar 14.

A particularly useful embodiment of the invention is disclosed in FIGURE II wherein the grounding electrode 15 is comprised of a glass tube 19 which is mounted on a spindle 20 in rigid spaced-apart relationship by means of ceramic plug insulators 21, lock washers 22 and lock nuts 23. This particular embodiment shows aluminum tinsel 24 packed tightly into the space between the glass outer surface and the spindle.

By using the illustrated embodiment of the invention, plastic films such as polyethylene can be treated to adhere to other materials such as printing inks in a rapid and inexpensive manner.

The electrostatic field 25 may be induced by any of the well-known techniques. The field may be formed by means of high voltage tubes, rods, screens, wires, bars or any other type of electrical conducting elements energized by means of high voltage transformers, generators, rectifiers or any other source of electrical energy. Particularly useful generators are Lepel models HSFG-6 and HFSG-2. The HFSG-6 mode operates with a power input of from 1 to 5.5 kilowatts at 230 or 460 volts, single phase, and 50–60 cycles and is particularly adapted to the varying input requirements which must be regulated in accordance with the thickness of the glass roller cover, the speed and thickness of the film and various other controllable factors.

The collector electrode may be any shape but is preferably in the form of a roller over which a film may pass at very high speeds. The non-metallic, substantially non-conductive outer surface of the roller which is in contact with the film may be any well-known substantially non-conductive, substantially amorphous material having good dielectric properties. Well-known useful materials are cement asbestos board, epoxy impregnated fiber glass, nylon, polyethylene glycol terephthalate, polytetrafluoroethylene, ceramic compositions, glass, etc. This surface may be as thin as structurally practical and when it is mounted on a rigid surface such as a spindle it may be as thin as .05 inch or thinner. It may be as thick as necessary for structural strength as long as it does not prevent completing the circuit by discharge therethrough. Thicknesses up to .50 inch and thicker may be utilized. In the embodiment shown in FIGURE II, the thickness of the glass surface will usually range from about .15 inch to about .30 inch.

In the embodiment shown in FIGURE II, the conductive medium may be any well-known type of frangible conductive material such as metallic strips, particles or powders and must be packed sufficiently tight to allow completion of the circuit as the electrical energy is collected from the discharge bar. Thin strips of aluminum tinsel have been found to be particularly useful. Obviously various mixtures of types and forms of frangible conductors may be used. Although the glass surface may be attached directly to the spindle which would act as a conductor, best results have been achieved by utilizing the structure shown in FIGURE II.

Any of the well-known plastic materials may be treated in accordance with this invention. For example, polystyrene and copolymers of styrene and other monomers such as the various well-known rubber compositions, acrylonitrile, polyolefins such as polybutadiene etc.; polyolefins such as polyethylene, polypropylene, polybutylene, etc.; and polyolefins modified with other olefin monomers and polyolefin mixtures may be treated in accordance with this invention. The invention is useful in treating films which may range in thickness from .0001 inch or less up to heavy films which may be as thick as 0.10 inch or thicker. The invention is particulraly useful for treating films, e.g., polyethylene films, which may range in thickness from .0005 inch to .060 inch.

The operating conditions of electrical potential, distance of the discharge bar from the grounding roller, the speed of the film etc., are all within the scope of the person skilled in the art and will depend upon the thickness of the surface of the roller, the thickness and speed of the film, etc.

Utilizing the present invention, a web of film may be passed through the electrostatic discharge device at a speed as high as 500 linear feet per minute or higher and the speeds will normally be from 10 to 200 linear feet per minute or more.

In a specific embodiment of the illustrated invention, the grounding roller had a glass wall 3/16 inch thick and the inside was packed tight with chopped-up aluminum tinsel such as that used for Christmas tree ornamentation. A web of polyethylene film 3 feet wide and .002 inch thick was passed over the roller and under the discharge bar at a speed of 70 linear feet per minute. The electrical potential was provided by a Lepel high frequency spark generator model HFSG-2 which was operated at a power input of .4 kilowatt at 220 volts. The discharge bar was spaced-apart from the surface of the roller a distance of .060 inch. The polyethylene film treated in this manner was readily printable, dyeable and readily adhered to pigments and flocs.

Although this invention has been described primarily in terms of film treatment, it is obvious that the apparatus may be modified to treat various other shapes and materials.

While certain representative embodiments and details have been shown for the purpose of illustrating the invention, it will be apparent to those skilled in this art that various changes and modifications may be made therein without departing from the spirit and scope of the invention.

What is claimed is:

1. In an apparatus for treating flexible plastic film with an electrostatic discharge, a rotatably mounted roller adapted to support the film and provide one electrode for the electrostatic discharge device comprised of a substantially non-conductive, non-metallic outer shell rigidly attached on the ends to a rotatable spindle with the inner portion being in spaced-apart relation to said spindle, the space between the outer shell and the spindle being substantially filled with a substantially comminuted conductive material.

2. The apparatus according to claim 1 wherein the outer shell is glass.

3. The apparatus according to claim 2 wherein the glass walls are from .05 inch to .50 inch thick.

4. The apparatus according to claim 1 wherein the conductive material is metallic strips.

5. The apparatus according to claim 4 wherein the conductive material is aluminum strips.

6. The apparatus according to claim 1 wherein the conductive material is metallic powders.

7. The apparatus according to claim 6 wherein the metallic powders are aluminum powders.

8. A method for treating flexible plastic film with an electrostatic discharge comprising passing a sheet of said film through an electrostatic discharge device comprised of an electrostatic discharge electrode on one side of the film and on the other side a rotatably mounted roller adapted to support the film and provide one electrode for the electrostatic discharge device comprised of a substantially non-conductive, non-metallic outer shell rigidly attached on the ends to a rotatable spindle with the inner portion in spaced-apart relation to said spindle, the space between the outer shell and the spindle being substantially filled with a substantially comminuted conductive material.

9. The method according to claim 8 wherein the film is passed through the electrostatic treating device at a speed of from 10 to 500 linear feet per minute.

10. The method according to claim 8 wherein the outer shell is glass.

11. The method according to claim 10 wherein the glass walls are from .05 inch to .50 inch thick.

12. The method according to claim 8 wherein the conductive material is metallic strips.

13. The method according to claim 12 wherein the metallic strips are aluminum strips.

14. The method according to claim 12 wherein the conductive material is metallic powders.

15. The method according to claim 14 wherein the metallic powders are aluminum powders.

16. In an apparatus for treating flexible plastic film with an electrostatic discharge, a unitary electrostatic discharge bar mounted on said apparatus in parallel spaced-apart relationship to a rotatable roller mounted on said apparatus adapted to support flexible plastic film and to provide a grounding electrode to collect the electrostatic discharge from said unitary electrostatic discharge bar, said roller being comprised of a substantially non-conductive, non-metallic tube adapted to form the outer shell of said roller, said tube being attached to and held in rigid spaced-apart relationship to a conductive spindle by means of non-conducting plug insulators, the space between the tube and the spindle being substantially filled with comminuted conductive particles.

References Cited by the Examiner

UNITED STATES PATENTS

| | | | |
|---|---|---|---|
| 2,864,756 | 12/1958 | Rothacker | 204—312 |
| 2,879,396 | 3/1959 | McDonald | 204—312 |
| 3,111,471 | 11/1963 | Evans et al. | 204—168 |

JOHN H. MACK, *Primary Examiner.*

H. S. WILLIAMS, *Assistant Examiner.*